United States Patent Office 3,720,611
Patented Mar. 13, 1973

3,720,611
GELATION INHIBITED SILICONE FLUIDS
A. D. Britt, Alexandria, Va., assignor to the United States of America as represented by the Secretary of the Navy
No Drawing. Continuation-in-part of abandoned application Ser. No. 22,083, Mar. 23, 1970. This application Mar. 23, 1971, Ser. No. 127,380
Int. Cl. C10m 3/46, 3/24
U.S. Cl. 252—18                                    9 Claims

ABSTRACT OF THE DISCLOSURE

Silicone fluids containing a small amount of alkali metal salt of trifluoroacetic acid have reduced tendency to form gelatinous solids as they decompose at high temperature. The function of said metal salt is improved by the addition of a small amount of sodium hydroxide.

CROSS REFERENCE TO RELATED APPLICATIONS

This application is a continuation-in-part of application Ser. No. 22,083 filed Mar. 23, 1970 and now abandoned.

BACKGROUND OF THE INVENTION

This invention relates to polysiloxane compositions which volatilize at decomposition temperatures. In particular, the invention is directed to silicone fluids containing fluorinated inorganic salts which effect the formation of gaseous decomposition products rather than polymeric solids at decomposition temperature.

Silicone fluids are well known for their thermal stability, inertness, relatively slight change in physical properties over extremely wide temperature ranges, electrical insulating properties, and the like. As a result, such fluids are commonly used as hydraulic fluids and lubricating oils in ship and aircraft mechanisms where extremes in temperature are common.

Although silicone fluids are relatively stable against oxidation, they do begin to decompose at temperatures above 200° C. Various stabilizers have been developed to increase the decomposition temperature up to 300° C.–400° C. However, in all known cases, the decomposition products are insoluble, resinous, gum-like solids and are greatly deleterious to the mechanisms in which they are used. Once decomposition of the silicone starts, it becomes very rapid due to the water formed by the oxidation reaction and unless the system is immediately cooled, the resinous decomposition products will cross-link to form hard grit-like materials which are completely ruinous to any intricate mechanical system.

STATEMENT OF THE OBJECTS OF THE INVENTION

It is a primary object of this invention to impair the formation of gelatinous solids in silicone fluids at temperatures where decomposition occurs.

It is a further object of this invention to provide a silicone fluid composition which will volatilize, instead of gel, at decomposition temperatures.

Another object of this invention is to provide a silicone fluid containing a fluorinated inorganic salt which impairs the formation of gelatinous solids when the fluid deteriorates.

SUMMARY OF THE INVENTION

This invention contemplates a silicone fluid containing a fluorinated inorganic salt in an amount of .05% to 5.0% by weight of the silicone fluid. The inorganic salts particularly useful in this invention comprise sodium and potassium salts of trifluoroacetate. It is found that if small amounts of the above inorganic acetates are mixed with silicone fluids and processed for at least 30 minutes at temperatures above 160° C., but below the fluid decomposition temperature, gelation of the fluids will be either entirely prevented or substantially diminished when elevated to the decomposition temperature. Small amounts of sodium hydroxide (0.01 to 0.016 percent by weight) added in addition to the acetate diminishes gelation even further. About 0.013 percent by weight of sodium hydroxide provides the best results.

DESCRIPTION OF THE PREFERRED EMBODIMENTS

The fluorinated inorganic salts of this invention may be produced by reacting a slight molar excess of sodium or potassium hydroxide with a molar amount of trifluoroacetic acid. The crystalline acetate formed thereby is filtered and dried for use with the silicone fluid.

Silicone fluids useful in carrying out the present invention are of the organopolysiloxane type such as "Dow Corning 200," "Dow Corning 510," and "Dow Corning 550" (obtained from the Dow Corning Corp.). These compounds are methyl and methylphenyl polysiloxanes which are thermally stabilized by increasing the degree of phenylation. "Dow Corning 200" has no phenyl groups attached to the silicon atom, whereas the percent molar ratio of methyl-phenyl groups to methyl-methyl groups for "Dow Corning 510" is 10% and "Dow Corning 550" is 70%. A further description of these organopolysiloxanes is found in U.S. Pat. No. 3,251,773 and in Naval Research Laboratory (NRL) Report 6156, entitled "Stabilization of Silicone Lubricating Fluids at 300–400° C. by Soluble Cerium Complexes" by H. R. Baker, J. G. O'Rear and P. J. Sniegoski (Jan. 8, 1965). The details set forth in the above two disclosures are herein incorporated by reference.

It is not exactly known how the fluorinated acetates react with the polysiloxanes. However, their effectiveness appears to be attributable to their inhibiting effect on water formation.

Specific processing procedures involve mixing 0.05% to 5.0% by weight of sodium or potassium trifluoroacetate with one of the aforementioned silicone fluids. Best results are obtained when about 0.1 percent by weight sodium trifluoroacetate is used with 0.013 percent by weight sodium hydroxide. The solution is heated for 30 minutes or more at temperatures below the decomposition temperature, but above 160° C. Note the following illustrative examples:

EXAMPLE I

One tenth gram of sodium trifluoroacetate is dissolved in 100 grams of "Dow Corning 510." The solution was heated for 40–60 minutes at 210°–225° C. One ml. samples of the above solution were then placed on thin glass discs which were supported on a hotplate surface maintained at approximately 400° C. Within 2–4 minutes the solution had evaporated with no gel or gum-like residue.

EXAMPLE II

The procedure of Example I was followed using one gram of sodium trifluoroacetate in 100 grams of "Dow Corning 550." The one ml. sample evaporated in 4 minutes at 400° C. leaving no gel or residue.

EXAMPLE III

The procedure of Example I was followed using two grams sodium trifluoroacetate in 100 grams of "Dow Corning 510." The results were the same as those obtained in Example I.

EXAMPLE IV

The procedure of Example I was followed using 0.1 gram sodium trifluoroacetate with 100 gm. "Dow Corning 200." The testing procedure was modified whereby visual comparisons between 1 ml. samples of untreated "Dow Corning 200" and 1 ml. samples of treated "Dow Corning 200" were made. The results showed gel formation in both samples, however, the residue left in the treated sample was approximately 10% of that remaining in the untreated sample.

EXAMPLES V to VIII

The procedures of Examples I to IV were followed using potassium trifluoroacetate. Visual comparisons between 1 ml. samples of fluids treated with the potassium salt and untreated silicone fluids resulted in the potassium salt being about half as effective as the sodium salt, i.e., some residue or gel was formed in all instances of the potassium-treated samples. In all cases, however, the potassium salt reduced the gel formation to less than half of what it was with the untreated samples.

EXAMPLES IX to XVI

The samples produced from Examples I to VIII were tested at approximately 600° C. The results were the same even though volatization and decomposition occurred in 10 to 20 seconds.

EXAMPLE XVII

Based on multiple individual 0.50 gram samples of polysiloxanes, a test was carried out in which 0.1% by weight sodium trifluoroacetate was added to each sample and 0.013% by weight sodium hydroxide was added to each non-control sample. Each sample was processed at 215–225° C. for one hour. After further heating at the indicated temperatures the samples were allowed to cool to room temperature and weighed. The results are shown in the following table.

| Polysiloxane | Heat applied, (° C.) | NaOH present | Average gel residue (grams) | Percent residue decrease when NaOH is present |
|---|---|---|---|---|
| "Dow Corning 200" | 400 | Non-control | 0.05 | |
| Do | 400 | Control | 0.03 | 40 |
| "Dow Corning 550" | 500 | Non-control | 0.04 | |
| Do | 500 | Control | 0.01–0.02 | 50–75 |
| "Dow Corning 710" | 600 | Non-control | 0.04 | |
| Do | 600 | Control | 0.02 | 50 |

It can be seen from the above examples that the treated silicone fluids of this invention are particularly useful as hydraulic fluids and lubricants in intricate mechanical devices subjected to high temperatures. The use of such treated silicone fluids gives an added insurance against mechanical breakdowns and replacement of expensive pumps, valve-control systems, servo-mechanisms, gyroscopes, etc. resulting from accidental overheating or continuous exposure to maximum temperature limits.

Obviously many modifications and variations of the present invention are possible in light of the above teachings. It is therefore to be understood that within the scope of the appended claims the invention may be practiced otherwise than as specifically described.

What is claimed and desired to be secured by Letters Patent of the United States is:

1. A silicon fluid composition comprising a major amount of an organopolysiloxane and from 0.05 percent to 5.0 percent by weight of an alkali metal salt of fluorinated acetic acid.
2. The composition recited in claim 1, wherein said salt is sodium trifluoroacetate.
3. The composition recited in claim 1, wherein said salt is potassium trifluoroacetate.
4. A silicone fluid composition comprising a major amount of an organopolysiloxane and the product of the reaction between said organopolysiloxane and 0.05% to 5.0% by weight of an alkali metal salt of fluorinated acetic acid formed by reacting a slight molar excess of an hydroxide selected from the group consisting of sodium hydroxide and potassium hydroxide with a molar amount of trifluoroacetic acid.
5. The organopolysiloxane fluid composition according to claim 1 containing 0.010 to 0.016 percent by weight sodium hydroxide.
6. The organopolysiloxane fluid composition according to claim 2 containing 0.010 to 0.016 percent by weight sodium hydroxide.
7. The organopolysiloxane fluid composition according to claim 2 containing about 0.013 percent by weight sodium hydroxide and about 0.1 percent by weight sodium trifluoroacetate.
8. A method of inhibiting degradation of organopolysiloxane fluids at high temperatures into solids comprising admixing with an organopolysiloxane fluid, .05% to 5.0% by weight of a sodium or potassium trifluoroacetate and 0.010 to 0.016 percent by weight of sodium hydroxide while said fluid is at a temperature which is above about 160° C. but below the decomposition temperature.
9. A method according to claim 8 wherein about 0.1 percent by weight sodium trifluoroacetate and about 0.013 percent by weight sodium hydroxide are admixed with the organopolysiloxane fluid.

References Cited
UNITED STATES PATENTS

| | | | |
|---|---|---|---|
| 2,806,867 | 9/1957 | Barnhart et al. | 252—33.6 |
| 3,269,948 | 8/1966 | Furly | 252—33.6 |
| 3,329,611 | 7/1967 | Chao | 252—33.6 |
| 3,436,348 | 4/1969 | Chao et al. | 252—33.6 |
| 3,634,242 | 1/1972 | Bosniack et al. | 252—33.6 |

DANIEL E. WYMAN, Primary Examiner

I. VAUGHN, Assistant Examiner

U.S. Cl. X.R.

252—25, 33.6, 49.6, 75, 400